June 10, 1969     R. C. VOCK     3,449,568
CORONA DISCHARGE APPARATUS FOR CREATING AN ELECTROSTATIC
CHARGE PATTERN ON A XEROGRAPHIC SURFACE
Filed Dec. 27, 1966
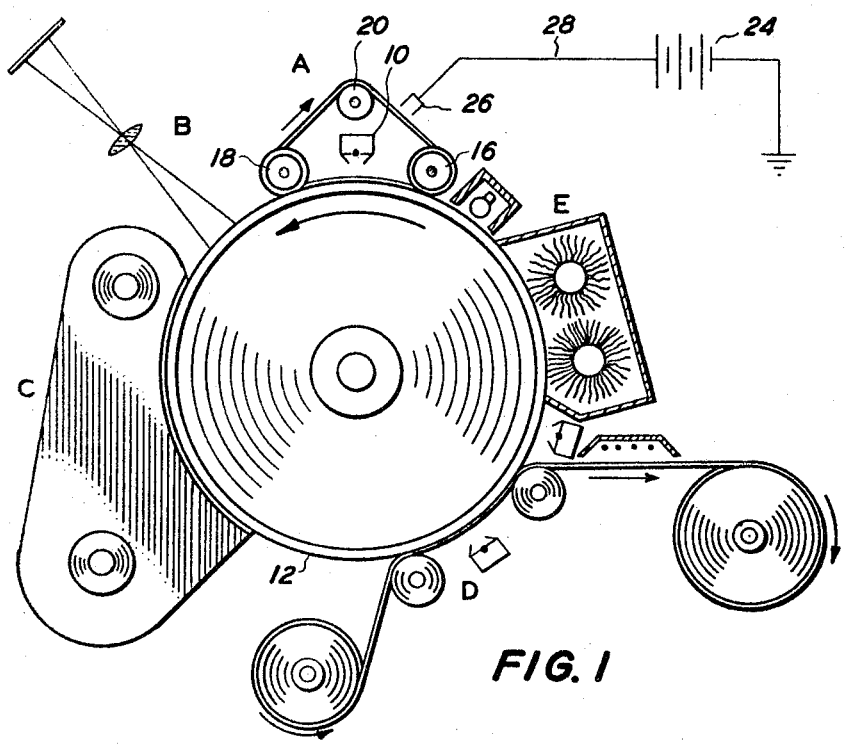
FIG. 1
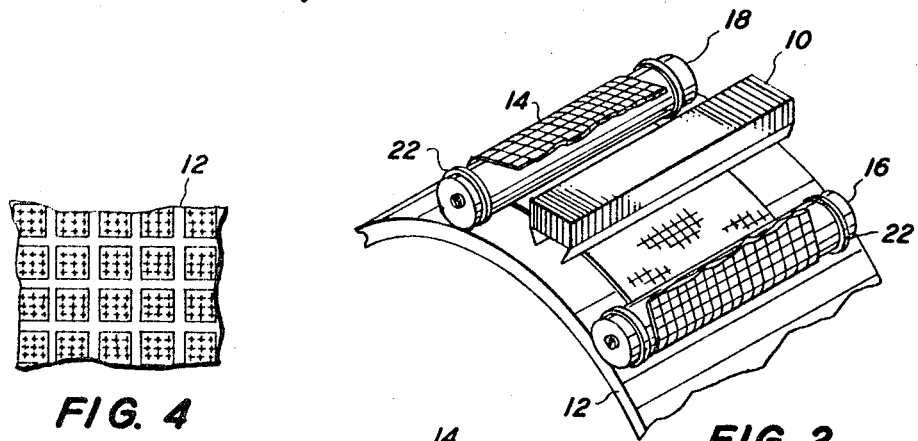
FIG. 4
FIG. 2
FIG. 3
INVENTOR.
RICHARD C. VOCK
BY
ATTORNEY United States Patent Office 3,449,568
Patented June 10, 1969

3,449,568
CORONA DISCHARGE APPARATUS FOR CREATING AN ELECTROSTATIC CHARGE PATTERN ON A XEROGRAPHIC SURFACE
Richard C. Vock, Ontario, N.Y., assignor to Xerox Corporation, Rochester, N.Y., a corporation of New York
Filed Dec. 27, 1966, Ser. No. 605,057
Int. Cl. H01j 37/26
U.S. Cl. 250—49.5                        5 Claims

ABSTRACT OF THE DISCLOSURE

Apparatus for changing a cylindrically shaped xerographic surface in a pattern configuration. The apparatus includes a corona discharge device spaced from the xerographic surface and a conductive screen contacting the xerographic surface in the path of flow of the corona discharge. The conductive screen is electrically biased to a polarity the same as that on the corona discharge device and moved in synchronism with the xerographic surface so that the charge laid down on the xerographic surface is continuous and in a pattern corresponding to apertures in the conductive screen.

---

This invention relates to the creation of electrostatic images used in the xerographic process and particularly to apparatus for creating a charged xerographic surface suitable for use in the creation of xerographic half-tone images or images having large solid areas.

In the xerographic process triboelectrically charged particles of a powder or toner material are electrostatically attracted and adhered to a surface containing images created with electrostatic charges. Because of the nature of an electrostatic charge in a photoconductive surface, such as a xerographic plate, the powder or toner particles are attracted to areas of the plate wherein there is a charge gradient. That is, electrostatic fields are sufficient to attract and retain toner particles only where there is a variation or gradient in the electrostatic charge on the xerographic surface. For example, in the production of line copy, the charge density of the image is such that the image areas are closely bound by uncharged or low charged areas. Where large solid areas are to be developed, the charge pattern within the solid area must be broken up to provide the charge gradient necessary to attract the toner particles. The same is true of tone or half-tone images where the changes in charge density is gradual or uniform between charged and uncharged areas. If the charge pattern is not broken up in these areas, then the resulting development produces figures having a halolike effect since toner particles only adhere around the edge of the figure while the center of the figure is hollow.

A common way of producing the charge gradient within the solid areas includes uniformly charging the surface of the xerographic plate and then exposing the plate to a light image of a dot or screen pattern thereby discharging the electrostatic charge in a pattern which would produce the charge gradient. After the surface is exposed to the desired screen pattern it is then exposed to the image to be reproduced and any large solid areas of electrostatic charge on the plate would resultantly have a charge gradient in accordance with the original screen pattern. The exposure to the screen or dot pattern can occur either before, during or after exposure to the image to be reproduced. The present invention, however, eliminates the necessity of exposing the charged xerographic surface to a light image of a screen pattern in order to produce the charge gradient used in the development of solid areas. This is achieved by producing the desired charge gradient concurrent with the original charging of the xerographic surface.

It is, therefore, an object of this invention to charge a surface with an electrostatic charge so as to produce a pattern of charge gradients throughout the entire surface.

It is also an object of this invention to improve solid area development in xerographic copy by a novel charging technique.

A further object of this invention is to create latent electrostatic images with a charge gradient throughout the entire image.

It is yet another object of this invention to charge a xerographic surface with a discontinuous charge distribution by deflecting some of the charging emissions with an electrically biased screen.

These and other objects of this invention are obtained by a biased screen or the like positioned between a xerographic surface to be charged and an electrostatic charge emitting device whereby the biased screen deflects portions of emitted electrostatic charge to thereby produce a discontinuous charge pattern on the surface.

For a better understanding of the invention as well as other objects and further features thereof reference is had to the following detailed description of the invention to be read in conjunction with the accompanying drawings wherein:

FIG. 1 is a schematic sectional view of a typical xerographic reproduction machine embodying the principles of the invention;

FIG. 2 is a perspective view of the xerographic charging apparatus as seen in FIG. 1;

FIG. 3 is a schematic illustration of the xerographic surface with the screen in intimate contact therewith showing a charge distribution thereover; and FIG. 4 is a schematic illustration of a portion of the xerographic surface after being charged in accordance with the invention but prior to exposure.

In order to charge in accordance with the instant invention, any conventional charging device may be employed, as for example, a corona emitting Corotron. The Corotron is operatively positioned adjacent a xerographic surface to thereby charge the surface to a degree efficient to carry out the subsequent xerographic reproduction steps. Positioned between the Corotron and xerographic surface, however, preferably in contact with the surface, there is placed a biased screen or the like with the apertures thereof corresponding to the locations of the xerographic surface intended to be charged. The body or strand portions of the screen act to outline the portions of the surface to be charged. No charge can be placed on the surface immediately beneath the strands of the screen.

When the emissions are produced by the Corotron, they are directed to the xerographic surface through the apertures of the screen to charge only those portions of the surface which are not covered by the strands which make up the screen. The strands of the screen are made of a conductive material and are biased to the same polarity as the charge to be put on the xerographic surface.

In the illustrated embodiment, the screen is biased to the same polarity and of approximately the same potential as that to be imparted to the xerographic surface by the corona emissions during the charging step. Corona emissions normally travel in a straight line path unless acted upon by an external force. The bias strands, however, constitute such an external force and the emissions which are moving towards such biased strands are deflected from their normal straight line course by the like polarity charge on these biased strands of the screen. Upon deflection, the emissions seek out the lower potential areas in the vicinity and thus move through the apertures toward the photoconductive surface for charging only those portions of the photoconductive surface not covered by the biased wire strands.

Shown in the figures is a xerographic machine constructed for continuous and automatic operation adapted to charge a xerographic surface in accordance with the instant invention. The elements of this machine, as shown schematically in FIG. 1 are all conventional in the xerographic art with the exception of the novel charging station. For the purpose of the present disclosure, the several xerographic processing stations in the path of movement of the xerographic surface may be briefly described as follows:

A charging station A, at which a patterned electrostatic charge is deposited on the photoconductive layer of the xerographic drum;

An exposure station B, at which the light or radiation pattern of copy to be reproduced is projected onto the drum surface to dissipate the drum charge in the exposed areas thereof to thereby form a latent electrostatic image of the copy to be reproduced;

A developing station C, at which a xerographic developing material, including toner particles having an electrostatic charge opposite to that of the electrostatic latent image, are moved into contact with the drum surface, whereby the toner particles adhere to the electrostatic latent image to form a xerographic powdered image in the configuration of the copy being reproduced;

A transfer station D, at which the xerographic powder image is electrostatically transferred from the drum surface to a transfer material or a support surface; and A drum cleaning and discharge station E, at which the drum surface is brushed to remove residual toner particles remaining thereon after image transfer, and at which the drum surface is exposed to a relatively bright light source to effect substantially complete discharge of any residual electrostatic charge remaining thereon.

Positioned within the charging station A of the machine is a charging device 10. The charging device may be any of the well-known corona emitting devices, as for example, a Corotron as described in U.S. Patent No. 2,836,725 to Vyverberg. The Corotron is adapted to be positioned adjacent a photoconductive surface which is illustrated herein as xerographic drum 12. Normally, during its operation, the Corotron will emit ions to the conductive backed xerographic surface to thereby deposit a uniform charge on the entire surface for subsequent exposure, development, transfer, etc. to carry out the xerographic cycle. In the normal practice, the charges are distributed evenly over the entire xerographic surfaces as it passes beneath the Corotron.

According to the instant invention, however, an apertured network such as screen 14 is adapted to be positioned between the Corotron and xerographic surface. It is also necessary that the xerographic surface and screen be operatively associated so that there is no relative movement between these two surfaces during charging. According to the illustrated embodiment, this is achieved by constructing the screen in an endless closed loop type configuration and holding it in its orientation with a plurality of guide type idler rollers 16, 18 and 20, so that the axes of these rollers are parallel to each other as well as parallel to the axis of the xerographic drum.

Positioned on the two screen guiding idler rollers 16 and 18 which are in closest relationship to the xerographic surface, are four motion imparting rings 22. These rings are preferably formed of an insulating frictional plastic material such as neoprene for rolling contact with the periphery of the xerographic drum. As the xerographic drum is rotated by any conventional power source, not shown, to move its xerographic surface through the several xerographic processing stations, it frictionally moves the rings 22 in synchronism with the drum surface to thereby move the screen at the same linear speed as the xerographic surface for a purpose to be later described. It is desirable to space the rings on the edges of the rollers so that the rings contact the drum beyond the xerographic layer of the drum surface.

Positioned within the development station is a potential source 24 adapted to create an output bias equal to that to which the xerographic surface will be charged by Corotron 10. Also located within the development zone is an electrical connector brush 26 adapted to continually contact the screen 14 as it is rotated along its normal path of movement. Electrical lead wires 28 interconnect the potential source 24 with the brush 26 and screen 14 for the application of the potential to the screen.

In order to use the machine of the instant invention, it is first necessary to initiate a general cycle initiating means, not shown. This will act to rotate the drum through the various processing stations as described above in the description of the stations. As the surface of the drum is rotated, it frictionally contacts rollers 22 to drive the idler rollers 16, 18 and 20 at the same speed as the drum. The movement of idler rollers 16, 18 and 20 in like manner acts to move that portion of the screen which is in intimate contact with the xerographic surface in synchronism with movement of the drum. The Corotron 10 which is also rendered operational by the general cycle initiating means acts to emit a corona discharge towards the xerographic surface of the drum 12. Inasmuch as the drum and its overlying screen are moved in synchronism, there will be portions of the drum which are never exposed to the corona emissions due to the presence of the overlying strand portions of the screen.

When the potential is applied to the screen by potential source 24, the screen will be charged to a potential and polarity the same as that adapted to be placed on the drum surface by the corona. Thus, as the emissions are directed from the corona source towards the surface, those portions of the surface immediately beneath the screen apertures will become charged by the emissions of the Corotron in a pattern corresponding to the apertures. The corona emissions directed towards the strand portions of the screen will be influenced by the like potential bias on the strands and will consequently be deflected from the strands. The deflected emissions will naturally seek out a lower potential surface to charge. Consequently, the emissions will move around the strands and through the screen apertures to spaces on the xerographic surface which are not covered by the strands. Inasmuch as the screen is moving in synchronism with the drum surface, the strand portions of the screen will always overlie the same portions of the xerographic surface so that the charge placed upon the xerographic surface defines a pattern as outlined by the strand portions of the screen. Note the illustration of a portion of the charged xerographic surface as shown in FIGURE 4.

As the screen and drum surface continue to move past the charging station, the screen will be directed away from the drum surface at roller 18. The disassociation of the screen from the drum surface will now render the drum surface charged in a patterned or gradient type configuration for subsequent imaging, developing, transfer and cleaning and back again to the charging station for a continuing cycle of operation in the conventional manner. FIGURE 3 illustrates the charged surface prior to its disassociation with the screen.

It has been disclosed that the screen should be in contact with the xerographic surface during the charging process. In practice the screen could, in fact, be slightly spaced therefrom. In such instance, however, there is a tendency for the bent emissions to diverge into the spaces on the xerographic surface desired to be left uncharged. There is also the increased possibility of arcing between the spaced screen and surface. Furthermore, as a practical matter, it is mechanically difficult to keep the moving screen at a fixed distance from the moving drum. In all, the screen to drum contact has been found to constitute the most desirable mode of operation.

As the charged xerographic surface moves through the imaging station B, the charge on the surface will be dissipated in a configuration as determined by the image to be reproduced. If the image to be reproduced contains extended solid area or half-tone portions, these areas will be broken up by the pattern on the xerographic surface as distributed by the novel charging apparatus. As such, gradient portions will exist in these areas for better solid area and half-tone capabilities. This will permit the developer to be attracted to these solid area portions since they are now made up of discharged lines and charged areas therebetween created by charging through the screen. This charge pattern can be seen by reference to FIG. 4.

As will be readily recognized, a fine mesh screen, that is, one made up of a plurality of fine strands and a multiplicity of small apertures, will produce the finest of resolutions due to their formation the great number of charge gradient portions on the charged and imaged xerographic surface. And while it has been disclosed that the apertured member is a screen, it should be understood that any similar apertured surface such as a flexible conductive plate with apertures therein or any similar surface made up of conductive strands or the like could likewise be employed. Any similarly functioning surfaces may be employed so long as their apertures are sufficient to pass the charge to the xerographic surface while prohibiting the corona emission to reach the xerographic surface in adjacent areas.

While it has been disclosed that this device is advantageously used on a continuous and automatic machine employing a xerographic surface in the shape of a drum, it should be understood that this invention could readily be practiced with flat plate equipment, on a flexible xerographic belt, or the like. The subsequent continuous steps of transfer and/or fusing may also be eliminated if the charging of the plate is to be done for xeroprinting or the like. Furthermore, the selection of the polarities, that is, positive discharge of the Corotron and negative toner particles has been selected as merely illustrative since the opposite charging patterns could readily be used if desired if proper photoconductors, toners, etc. were employed.

An example of the parameters under which charging in accordance with the instant invention could be practiced include a Corotron 10 biased and spaced with respect to the xerographic surface to charge the surface to 800 volts positive. In such case a positive 800 volts potential source 24 would be employed to bring up the screen to the same 800 volts. These parameters, however, should be considered as illustrative only inasmuch as the invention can be carried out through a wide range of operating conditions as determined by the other variable factors of the system.

While the present invent, as to its objects and advantages, has been described herein as carried out in specific embodiments thereof, it is not desired to be limited thereby; but it is intended to cover the invention broadly within the spirit and scope of the appended claims.

What is claimed is:
1. Apparatus for creating an electrostatic charge pattern on a xerographic surface including
   charging means adapted to emit a corona discharge adjacent a xerographic surface,
   a conductive member positioned in contact with the xerographic surface in the path of flow of the corona discharge, the conductive member being formed with apertures and
   means applying an electric potential of the same polarity as the corona discharge to the conductive member whereby the emitted corona discharge will be deflected around the conductive portions of the conductive member to charge the xerographic surface only in areas corresponding to the apertures of the conductive member.

2. The apparatus as set forth in claim 1 wherein the conductive member is a screen.

3. Apparatus for creating an electrostatic charge pattern on a xerographic surface including
   charging means adapted to emit a corona discharge adjacent the xerographic surface,
   a conductive member formed in a closed loop cross-sectional configuration having a portion of its extent in contact with the xerographic surface in the path of flow of the corona discharge, the conductive member being formed with apertures,
   means to apply an electric potential of the same polarity as the corona discharge to the conductive member whereby the emitted corona discharge will be deflected around the conductive portion of the conductive member to charge the xerographic surface only in areas corresponding to the apertures of the conductive member and
   means to move the conductive member in rolling contact with the xerographic surface for charging the xerographic surface in a continuous fashion.

4. The apparatus as set forth in claim 3 wherein the means to move the conductive member includes a series of idler rollers, rotatable to move the conductive member in response to the movement of the xerographic surface.

5. The apparatus as set forth in claim 4 wherein one of the idler rollers is positioned to direct the conductive member away from the xerographic surface after charging but prior to the movement of the charged xerographic surface past subsequent xerographic processing stations.

References Cited
UNITED STATES PATENTS

| | | | |
|---|---|---|---|
| 2,777,957 | 1/1957 | Walkup | 250—49.5 |
| 3,220,324 | 11/1965 | Snelling | 95—1.7 |
| 3,248,216 | 4/1966 | Weigl | 96—1 |

WILLIAM F. LINDQUIST, *Primary Examiner.*

U.S. Cl. X.R.

96—1; 250—65